(12) United States Patent
Cheatham, III et al.

(10) Patent No.: US 11,031,142 B2
(45) Date of Patent: Jun. 8, 2021

(54) DOPPLER REACTIVITY AUGMENTATION DEVICE

(71) Applicant: TerraPower, LLC, Bellevue, WA (US)

(72) Inventors: Jesse R. Cheatham, III, Seattle, WA (US); Mark W. Reed, Seattle, WA (US); Micah J. Hackett, Seattle, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 1361 days.

(21) Appl. No.: 14/839,418

(22) Filed: Aug. 28, 2015

(65) Prior Publication Data

US 2016/0064105 A1 Mar. 3, 2016

Related U.S. Application Data

(60) Provisional application No. 62/043,210, filed on Aug. 28, 2014.

(51) Int. Cl.
 *G21C 7/02* (2006.01)
 *G21C 7/06* (2006.01)
 *G21C 1/02* (2006.01)
 *G21C 7/08* (2006.01)

(52) U.S. Cl.
 CPC .............. *G21C 7/06* (2013.01); *G21C 1/022* (2013.01); *G21C 7/02* (2013.01); *G21C 7/08* (2013.01); *Y02E 30/30* (2013.01)

(58) Field of Classification Search
 CPC ............. G21C 1/022; G21C 7/02; G21C 3/07
 See application file for complete search history.

(56) References Cited

U.S. PATENT DOCUMENTS 3,226,998 A 1/1966 Coats
3,660,230 A 5/1972 Bailey, Jr. et al.
(Continued)

FOREIGN PATENT DOCUMENTS

CN 101809674 B 9/2013
CN 103871485 B 6/2016
(Continued)

OTHER PUBLICATIONS

A.T. Santhanam, A. Taylor, B.J. Kestel, C. Steves. "Swelling Studies of Vanadium and Vanadium-1 wt%Titanium Alloy Using Ion Simulation Techniques". Argonne National Laboratory, ANL-AP/CTR/TM-26, CONF-741015-11 (1974).
(Continued)

*Primary Examiner* — Lily C Garner
(74) *Attorney, Agent, or Firm* — Jeremy P. Sanders

(57) ABSTRACT

A fast neutron nuclear reactor contains a nuclear reactor core having an array of device locations. Some device locations in the nuclear reactor core contain fissile and fertile nuclear fuel assembly devices. One or more other device locations in the nuclear reactor core contain Doppler reactivity augmentation devices that amplify the negativity of the Doppler reactivity coefficient within the nuclear reactor core. In some implementations, a Doppler reactivity augmentation device can also reduce the coolant temperature coefficient within the nuclear reactor core. Accordingly, a Doppler reactivity augmentation device contributes to a more stable nuclear reactor core.

36 Claims, 11 Drawing Sheets

(56) References Cited

U.S. PATENT DOCUMENTS

| | | | | |
|---|---|---|---|---|
| 3,841,964 | A | * | 10/1974 | Dunnayne .............. G21C 1/03 376/271 |
| 8,155,260 | B2 | | 4/2012 | Lee et al. |
| 8,444,782 | B2 | | 5/2013 | Kim et al. |
| 8,942,338 | B2 | | 1/2015 | Ahlfeld et al. |
| 2008/0144762 | A1 | * | 6/2008 | Holden .............. C22C 16/00 376/416 |
| 2010/0040187 | A1 | * | 2/2010 | Ahlfeld .............. F28D 15/0275 376/367 |
| 2010/0254501 | A1 | * | 10/2010 | Ahlfeld .............. G21C 1/022 376/220 |
| 2012/0020447 | A1 | * | 1/2012 | Ingraham .............. G21C 3/322 376/412 |
| 2013/0170603 | A1 | | 7/2013 | Baek et al. |
| 2014/0185733 | A1 | | 7/2014 | Povirk et al. |

FOREIGN PATENT DOCUMENTS

| | | |
|---|---|---|
| RU | 2265899 C2 | 12/2005 |
| RU | 2331941 C2 | 8/2008 |
| WO | 2010019199 A1 | 2/2010 |
| WO | 2010147615 A1 | 12/2010 |
| WO | 2011042406 A1 | 4/2011 |
| WO | 2016033550 A1 | 3/2016 |

OTHER PUBLICATIONS

B.A. Loomis, D.L. Smith. "Swelling Dependence of Neutron-Irradiated Vanadium Alloys on Temperature, Neutron Fluence, and Thermomechanical Treatment". Argonne National Laboratory, CONF-901007-52, DE91 006531 (1990).

B.A. Loomis, G. Wiggins. "Corrosion and oxidation of vanadium-base alloys". Journal of Nuclear Materials 122-123:693-697 (1984).

D.L. Smith, B. A. Loomis, H.M. Chung. "Effects of Neutron Irradiation on Vanadium-Base Alloys". Plasma Devices and Operations 3:167-179 (1994).

D.N. Braski. "The Effect of Neutron Irradiation on Vanadium Alloys". Journal of Nuclear Materials 141-143:1125-1131 (1986).

G. Edison, G.A. Whitlow. "Vanadium Alloys vs. Stainless Steel for Sodium-Cooled Fast Reactor Cladding". Nuclear Applications Technology 7:443-455 (1969).

H. Matsui, K. Fukumoto, D.L. Smith, M. Chung, W. Van Witzenburg, S. N. Votinov. "Status of Vanadium Alloys for Fusion Reactors". Journal of Nuclear Materials 2.X-2.77:92-99 (1996).

H. Tsai, H. Matsui, M. C. Billone, R. V. Strain, D. L. Smith. "Irradiation creep of vanadium-base alloys". Journal of Nuclear Materials 258-263:1471-1475 (1998).

H.M. Chung, B.A. Loomis, D.L. Smith. "Creep properties of vanadium-base alloys". Journal of Nuclear Materials 212-215: 772-777 (1994).

K. Fukumoto, H. Matsui, M. Narui, M. Yamazaki. "Irradiation creep behavior of V—4Cr—4Ti alloys irradiated in a liquid sodium environment at the JOYO fast reactor". Journal of Nuclear Materials 437:341-349 (2013).

K.F. Smith, R. J. Van Thyne. "Selected Properties of Vanadium Alloys for Reactor Application", Argonne National Laboratory, ANL-5661 (1957).

M. Le Flem, J.-M. Gentzbittel, P. Wident. "Assessment of a European V—4Cr—4Ti alloy—CEA-J57", Journal of Nuclear Materials 442:325-329 (2013).

M. Li, D. T. Hoelzer, M. L. Grossbeck, A. F. Rowcliffe, S. J. Zinkle, R. J. Krutz. "Irradiation creep of the US Heat 832665 of V—4Cr—4Ti", Journal of Nuclear Materials 3860388:618-621 (2009).

N. Chaia, S. Mathieu, T. Cozzika, F. Rouillard, C. Desgranges, J. L. Courouau, C. Petitjean, N. David, M. Valasi. "An Overview of the oxidation performance of silicide diffusion coatings for vanadium-based alloys for generation IV reactors". Corrosion Science 66:285-291 (2013).

S. Mathieu, N. Chaia, M. Le Flem, M. Vilasi. "Multi-layered silicides coating for vanadium alloys for general IV reactors". Surface & Coatings Technology 206:4594-4600 (2012).

S. Ohnuki, H. Takahashi, H. Kinoshita, R. Nagasaki. "Void Formation and Precipitation in Neutron Irradiated Vanadiaum Alloys" Journal of Nuclear Materials 155-157:935-939 (1988).

T. Muroga, J. M. Chen, V. M. Chernov, R. J. Kurtz, K. Le Flem. "Present Status of Vanadium Alloys for Fusion Applications". Journal of Nuclear Materials 455:263-268 (2014).

T. Muroga, T. Nagasaka, K. Abe, V. M. Chernov, H. Matsui, D. L. Smith, Z.-Y. Xu, S. J. Zinkle. "Vanadium alloys—overview and recent results", Journal of Nuclear Materials 307-311:547-554 (2002).

V. M. Troyanov, M.G. Bulkanov, A.S. Kruglov, E.A. Krjuchkov, M.P. Nikulin, J.M. Pevchykh, A. E. Rusanov, A. A. Smirnoff, S.N. Votinov. "Irradiation Creep of V—Ti—Cr Alloy in Br-10 Reactor Core Instrumented Experiments". Journal of Nuclear Materials 233-237:381-384 (1996).

W.E. Ruther. "The Corrosion of Vanadium and Vanadium-Base Alloys in Sodium". Argonne National Laboratory, ANL-7505, May (1969).

Edison et al., "Vanadium Alloys vs Stainless Steel for Sodium-Cooled Fast Reactor Cladding", Nuclear Applications & Technology vol. 7, Nov. 1969, pp. 443-455.

International Searchng Authority,U.S. Patent and Trademark Office, International Search Report and Written Opinion for PCT/US15/47580, dated Jan. 5, 2016, 12 pages.

* cited by examiner

DOPPLER REACTIVITY AUGMENTATION DEVICE

CROSS-REFERENCE TO RELATED APPLICATIONS

The present invention claims priority of U.S. Provisional Patent Application No. 62/043,210, entitled "Breed-and-Burn Sodium Fast Reactor with Vanadium Alloy Structural Material" and filed on Aug. 28, 2014, specifically incorporated herein for all that it discloses and teaches.

BACKGROUND

A fast spectrum nuclear fission reactor ("fast neutron reactors"), such as a sodium fast reactor, generally includes a reactor vessel containing a reactor core forming an array of device locations for fuel assembly devices and other reactor support devices. Fissile nuclear fuel is subjected to neutron collisions that result in fission reactions. In a breed-and-burn fast neutron reactor, a fission chain reaction is sustained by "fast neutrons" that breed fissile nuclear fuel from fertile nuclear fuel. Liquid coolant flows through the reactor core, absorbing thermal energy from the nuclear fission reactions that occur in the reactor core. The coolant then passes to a heat exchanger and a steam generator, transferring the thermal energy to steam in order to drive a turbine that generates electricity. Design of such reactors involves combinations of materials, structures, and control systems to achieve desirable operational parameters, including reactor core stability, efficient thermal generation, long-term structural integrity, etc.

SUMMARY

The described technology provides a fast neutron nuclear reactor containing a nuclear reactor core having an array of device locations. Some device locations in the nuclear reactor core contain fissile and fertile nuclear fuel assembly devices. One or more other device locations in the nuclear reactor core contain Doppler reactivity augmentation devices that amplify the negativity of the Doppler reactivity coefficient within the nuclear reactor core. In some implementations, a Doppler reactivity augmentation device can also reduce the coolant temperature coefficient within the nuclear reactor core. Accordingly, a Doppler reactivity augmentation device contributes to a more stable nuclear reactor core.

In one implementation, the Doppler augmentation device includes vanadium or a vanadium alloy, such as V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, V-4Cr-4i Heat CEA-J57, etc. In other implementation, other materials and alloys may be employed, including titanium alloys. The vanadium or vanadium alloy (referred to herein as "vanaloys") may be employed as a structural material (e.g., for pin cladding and assembly ducts).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Fast nuclear reactors are designed to increase the utilization efficiency of nuclear fuel (e.g., uranium) in fission reactions. Fast reactors can capture significantly more of the energy potentially available in natural uranium, for example, than typical light-water reactors. Production of energy in the fast reactor core is intense because of the high-energy neutrons that are employed in the fast nuclear reactor core. However, the high burnup and energy intensity in fast reactors also stresses the structural material in the nuclear fuel assembly devices to a greater degree relative to light-water reactors.

A particular classification of fast nuclear reactor, referred to as a "breed-and-burn" fast reactor (of which one type is a fast reactor), is a nuclear reactor capable of generating more fissile nuclear fuel that it consumes. For example, the neutron economy is high enough to breed more fissile nuclear fuel from fertile nuclear reactor fuel, such as uranium-238 nuclear or thorium-232 fuel, than it burns. The "burning" is referred to as "burnup" or "fuel utilization" and represents a measure of how much energy is extracted from the nuclear fuel. Higher burnup typically reduces the amount of nuclear waste remaining after the nuclear fission reaction terminates.

Another particular classification of a fast nuclear reactor is based on the type of nuclear fuel used in the nuclear fission reaction. A metal fuel fast nuclear reactor employs a metal fuel, which has advantage of high heat conductivity and a faster neutron spectrum than in ceramic-fueled fast reactors. Metal fuels can exhibit a high fissile atom density and are normally alloyed, although pure uranium metal has been used in some implementations. In a fast nuclear reactor, minor actinides produced by neutron capture of uranium and plutonium can be used as a metal fuel. A metal actinide fuel is typically an alloy of zirconium, uranium, plutonium, and minor actinides.

Figure 1:
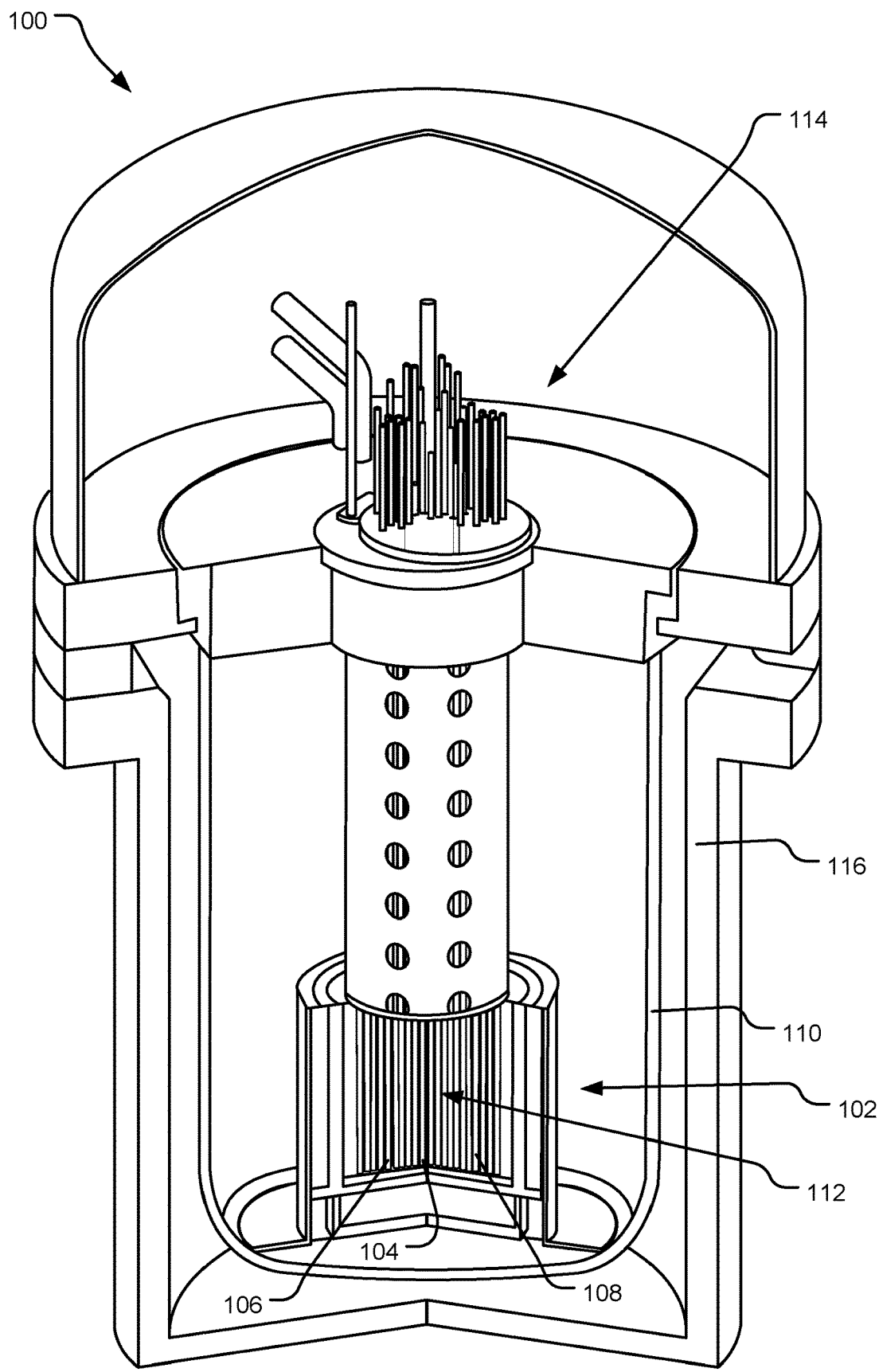
FIG. 1 illustrates a partial-cutaway perspective view of an example nuclear fission reactor with a fast nuclear reactor core containing a Doppler reactivity augmentation element.

FIG. 1 illustrates a partial-cutaway perspective view of an example nuclear fission reactor 100 with a fast nuclear reactor core 102 containing one or more Doppler reactivity augmentation devices (such as a Doppler reactivity augmentation device 104). Other elements within the fast nuclear reactor core 102 include nuclear fuel assembly devices (such as a nuclear fuel assembly device 106) and movable reactivity control assembly devices (such as a movable reactivity control assembly device 108). Certain structures of the example nuclear fission reactor 100 have been omitted, such as coolant circulation loops, coolant pumps, heat exchangers, reactor coolant system, etc., in order to simplify the drawing. Accordingly, it should be understood that the example nuclear fission reactor 100 may include additional structures not shown in FIG. 1.

Implementations of the nuclear fission reactor 100 may be sized for any application, as desired. For example, various implementations of the nuclear fission reactor 100 may be used in low power (~5 Mega Watt thermal) to around 1000 Mega Watt thermal) applications and large power (around 1000 Mega Watt thermal and above) applications, as desired.

Some of the structural components of the fast nuclear reactor core 102 may be made of refractory metals, such as tantalum (Ta), tungsten (W), rhenium (Re), or carbon composites, ceramics, or the like. These materials may be selected to address the high temperatures at which the fast nuclear reactor core 102 typically operates. Structural characteristics of these materials, including creep resistances, mechanical workability, corrosion resistance, etc., may also be relevant to selection. Such structural components define an array of device locations within the fast nuclear reactor core 102.

The fast nuclear reactor core 102 is disposed in a reactor vessel 110 containing a pool of coolant (such as liquid sodium). For example, in various implementations, a reactor coolant system (now shown) includes a pool of liquid sodium disposed in the reactor vessel 110. In such cases, the fast nuclear reactor core 102 is submerged in the pool of liquid sodium coolant in the reactor vessel 110. The reactor vessel 110 is surrounded by a containment vessel 116 that helps prevent loss of the liquid sodium coolant in the unlikely case of a leak from the reactor vessel 110. In alternative implementations, coolant can flow through coolant loops throughout the nuclear fission reactor 100.

The fast nuclear reactor core 102 contains the array of device locations for receiving various reactor core devices, such as nuclear fuel assembly devices, reactivity control assembly devices and Doppler reactivity augmentation devices, within the central core region 112. An in-vessel handling system (not shown) is positioned near the top of the reactor vessel 110, at about location 114, and is configured to shuffle individual reactor core devices in and/or out of the device locations within the fast nuclear reactor core 102. Some reactor core devices may be removable from the fast nuclear reactor core 102, while other reactor core devices may not be removable from the fast nuclear reactor core 102.

The fast nuclear reactor core 102 can include a nuclear fission igniter and a larger nuclear fission deflagration burn-wave-propagating region. The nuclear fission igniter provides thermal neutrons for the fission reaction of fissile nuclear fuel. The larger nuclear fission deflagration burn-wave-propagating region may contain thorium (Th) or uranium (U) fuel and functions on the general principles of fast neutron spectrum fission breeding.

In one implementation, the nuclear fuel within a nuclear fuel assembly device may be contained within fissile nuclear fuel assembly devices or fertile nuclear fuel assembly devices. The difference between fissile nuclear fuel assembly devices or fertile nuclear fuel assembly devices is effectively the enrichment level of the nuclear fuel, which can change over time within the fast nuclear reactor core 102. Structurally, fissile nuclear fuel assembly devices or fertile nuclear fuel assembly devices can be identical in some implementations. The nuclear fuel assembly device 106 in the fast nuclear reactor core 102 can include a solid hexagonal tube surrounding a plurality of fuel elements, such as fuel pins, which are organized into the nuclear fuel assembly device 106. Non-hexagonal tubes may also be used on some implementations. The tubes in a nuclear fuel assembly device 106 allow coolant to flow past the fuel pins through interstitial gaps between adjacent tube walls. Each tube also allows individual assembly orificing, provides structural support for the fuel bundle, and transmits handling loads from a handling socket to an inlet nozzle. Fuel pins typically consist of multiple nuclear fuel rods (such as uranium, plutonium or thorium) surrounded by a liner and cladding (and sometimes an additional barrier), which prevents radiative material from entering the coolant stream. Individual pins of a nuclear fuel assembly device 106 in the fast nuclear reactor core 102 can contain fissile nuclear fuel or fertile nuclear fuel depending on the original nuclear fuel rod material inserted into the pin and the state of breeding within the pin.

The movable reactivity control assembly device 108 can be inserted into and/or removed from the central core region 112 by the in-vessel handling system to provide real-time control of the fission process, balancing the needs of keeping the fission chain reaction active while preventing the fission chain reaction from accelerating beyond control. The state of a fission chain reaction is represented by an effective multiplication factor, k, which indicates the total number of fission events during successive cycles of the chain reaction. When a reactor is in a steady state (i.e., each individual fission event triggers exactly one subsequent fission event), k equals 1. If k>1, the reactor is supercritical and the reaction rate will accelerate. If k<1, the reactor is subcritical and the fission rate will decrease. Conditions within the central core region 112 change over time. Hence, movable reactivity control assemblies may be used to adjust the multiplication factor of the fission chain reaction as conditions change.

The movable reactivity control assembly device 108 is a highly effective neutron absorbing mechanical structure that can be actively inserted into or removed from the central core region 112 while the fission process is occurring. A movable reactivity control assembly device includes chemical elements of a sufficiently high neutron capture cross-section to absorb neutrons in the energy range of the nuclear fission reaction, as measured by its absorption cross-section. As such, the movable reactivity control assembly device 108 influences the number of neutrons available to cause a fission reaction within the fast nuclear reactor core 102, thereby controlling the fission rate of the fissile nuclear fuel within the fast nuclear reactor core 102. Example materials used in movable reactivity control assembly devices of the fast nuclear reactor 100 include without limitation boron carbide, an alloy of silver, indium, and cadmium, or a hafnium-hydride. By controlling the portion of the movable reactivity control assembly device 108 (as well as the number of movable reactivity control assemblies) that interacts with the fission reaction within the central core region 112, the multiplication factor can be tuned to maintain reactor criticality. Accordingly, a movable reactivity control assembly device 108 represents an adjustable parameter for controlling the nuclear fission reaction.

The Doppler reactivity augmentation device 104 contains one or more materials capable of altering the Doppler reactivity coefficient within a nuclear fission reaction of the fast nuclear reaction core 102. For example, the Doppler reactivity augmentation device 104 can amplify the negativity of the Doppler reactivity coefficient within the fast nuclear reactor core 102. In some implementations, a Doppler reactivity augmentation device 104 can also reduce the coolant temperature coefficient within the fast nuclear reactor core 102. The Doppler reactivity coefficient may be considered the fuel temperature coefficient of reactivity, representing the change in reactivity per degree of change in the temperature of the nuclear fuel. The Doppler reactivity coefficient arises from or is caused by the Doppler broadening effect, which refers to the broadening of spectral lines caused by distribution of relative velocities of neutrons and fuel nuclides within the fast nuclear reactor core 102. The Doppler reactivity coefficient is modified by changing the spectrum of the nuclear fission reactor 100. Faster neutrons are scattered to lower energies at levels where the Doppler broadening effect can occur. Nearly all Doppler broadening occurs below 10 keV. For example, capture resonances for uranium-238-based metal fuel in the 0.8-3 keV energy range exhibit substantial Doppler broadening as the reaction environment temperatures rise. Accordingly, increasing the neutron flux within the Doppler broadening energy range enhances the transmutation of fertile nuclear fuel into fissile nuclear fuel.

In one implementation, the nuclear fission reactor 100 is a fast spectrum nuclear fission reactor having an average neutron energy of greater than or equal to 0.1 MeV.

In one implementation, one or more materials in the Doppler reactivity augmentation device 104 introduce a large positive contribution by enhancing elastic scattering for neutrons having an energy within the Doppler broadening energy range of the fertile nuclear fuel of the fast nuclear reaction core 102. In this manner, neutrons having an energy in the primary Doppler broadening energy range of the nuclear fuel are elastically scattered within the central core region 112, increasing the probability of neutrons colliding with fertile fuel nuclides and resulting in enhanced transmutation reactions to breed fissile nuclear fuel. Thus, for uranium-238-based metal fuel, the greater number of neutrons scattered in the 0.8-3 keV energy range, the greater contribution made by Doppler broadening to the probability of a transmutation or breeding reaction.

Vanadium is an example element that is characterized by a neutron scattering cross-section that overlaps the Doppler broadening energy range of uranium-238-based fuels. Several vanadium alloys ("vanaloys") are also characterized by a neutron scattering cross-section that overlaps the Doppler broadening energy range of uranium-238-based fuels, including without limitation V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4i Heat CEA-J57. Titanium and titanium alloys have been found to provide a similar although less appreciable effect. Alloys having at least 10% vanadium or titanium by mass can provide a substantial Doppler reactivity augmentation benefit by increasing the negative Doppler reactivity coefficient feedback, although alloys having 30% or more vanadium or titanium generally produce better results, as do vanadium-based or titanium-based alloys having 50% or greater vanadium or titanium by mass.

Figure 2:
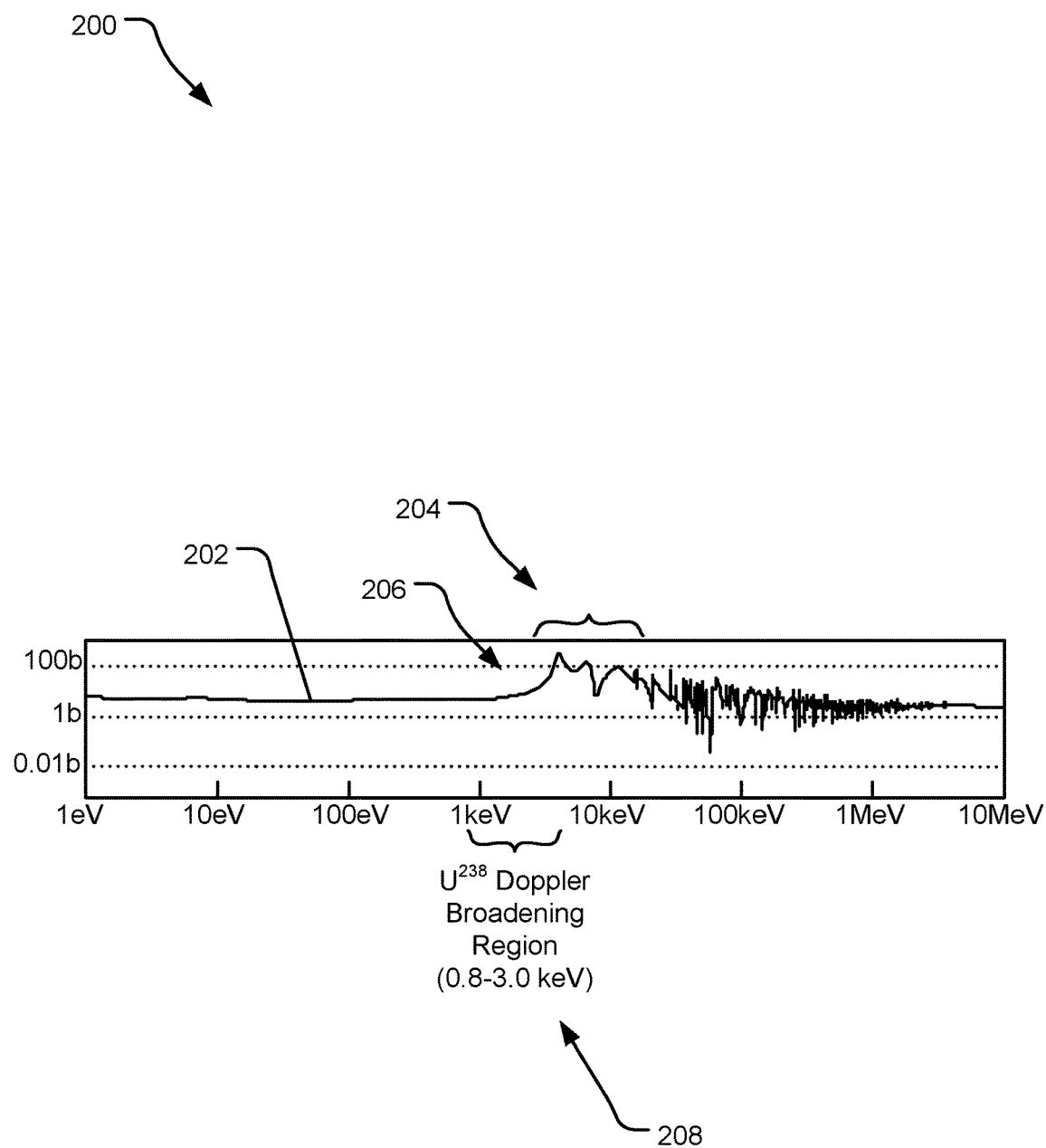
FIG. 2 illustrates a data chart for the neutron scattering cross-section of vanadium (V-51).
Figure 3:
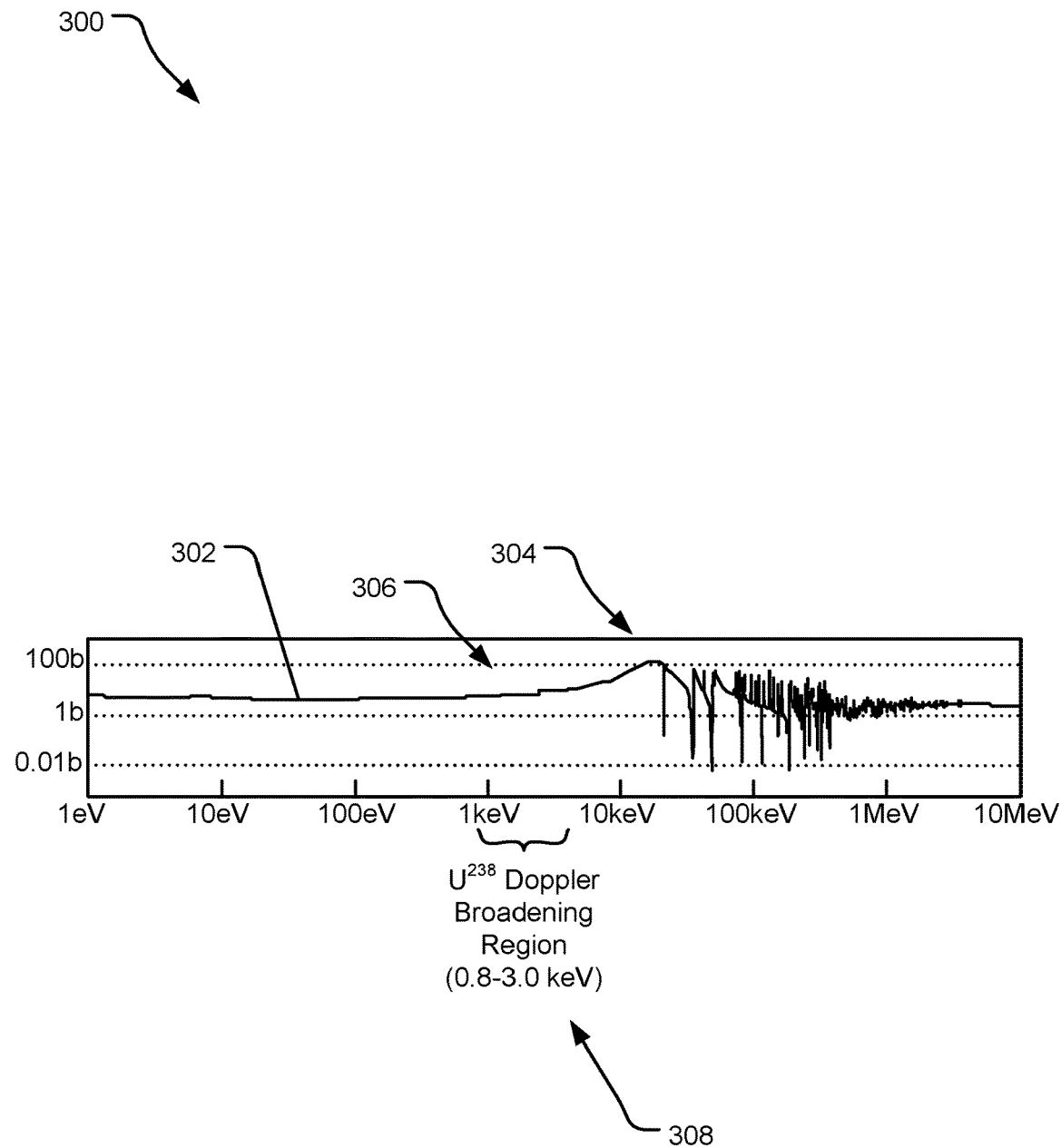
FIG. 3 illustrates a data chart for the neutron scattering cross-section of titanium (Ti-48).

As shown in the data chart 200 in FIG. 2, vanadium is characterized by a neutron scattering cross-section 202 having three large resonances (at 204) and a tail 206 near or below 10 keV. A region 208 shows the primary Doppler broadening region of uranium-238-based fuels. Note the overlapping of at least one resonance and the associated tail 206 with the primary Doppler broadening region 208. Titanium and titanium alloys are another example of materials that can enhance neutron scattering within the Doppler broadening energy range of uranium-238-based fuels. As shown in the data chart 300 in FIG. 3, titanium is characterized by a neutron scattering cross-section 302 having a large resonance 304 near just above 10 keV and a large tail 306 below 10 keV. A region 308 shows the primary Doppler broadening region of uranium-238-based fuels. Note the overlapping tail 306 with the primary Doppler broadening region 308. Accordingly, vanadium, titanium, and certain of their alloys are example materials for use in the Doppler reactivity augmentation device.

Figure 4:
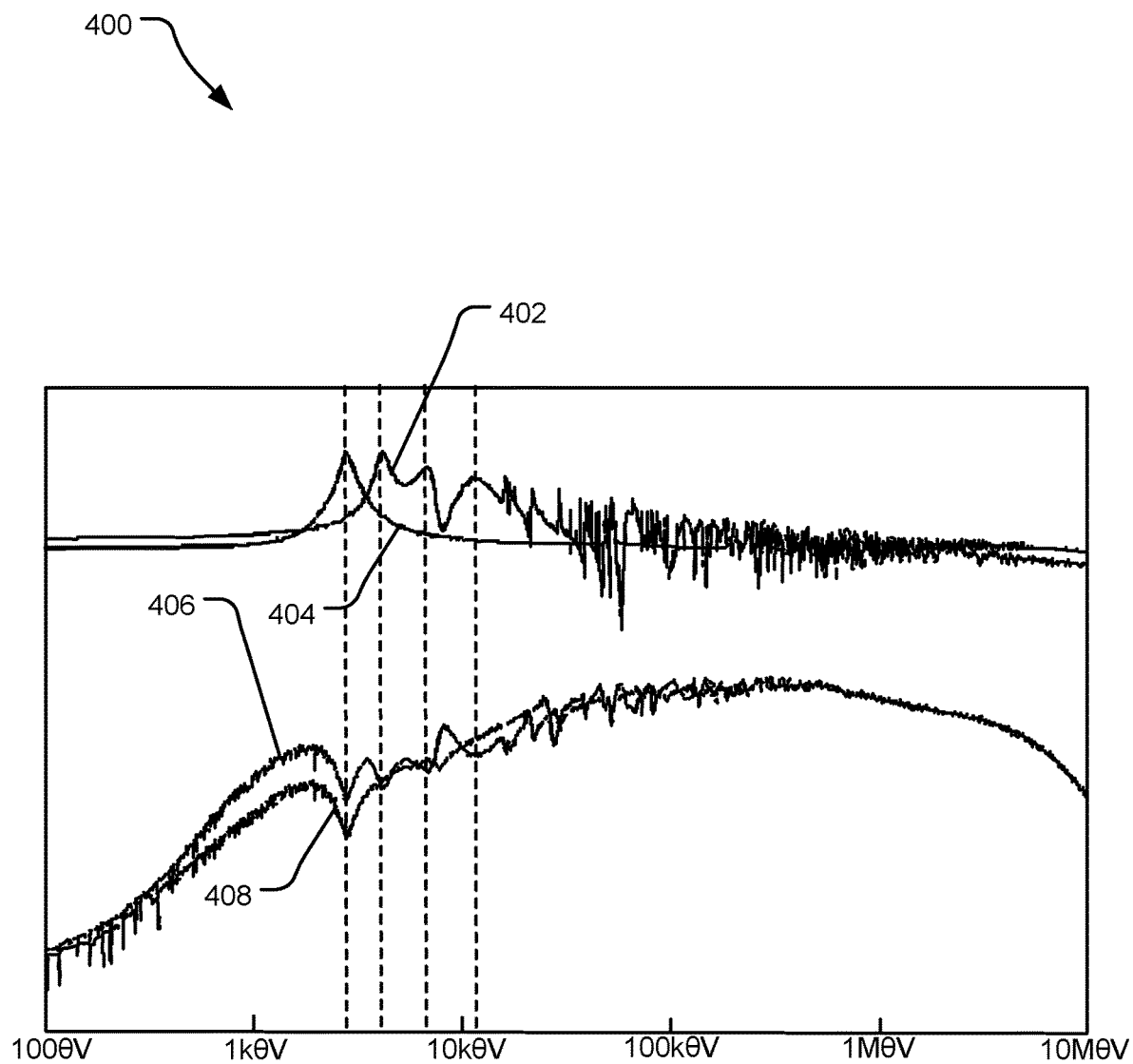
FIG. 4 illustrates a data chart including the neutron scattering cross-sections of vanadium and sodium compared with the neutron fluxes of different fast neutron reactors.

FIG. 4 illustrates a data chart 400 including the neutron scattering cross-sections of vanadium (402) and sodium (404) compared with the neutron fluxes of different fast neutron reactors. The neutron flux of a fast reactor employing HT9 stainless steel is shown in FAST REACTOR-S data 406, and the neutron flux of a fast reactor in which some or all of the HT9 stainless steel of the FAST REACTOR-S reactor core is replaced with vanadium or a vanadium alloy is shown in FAST REACTOR-V data 408. Neutron flux refers to the total length travelled by all neutrons per unit time and volume or, nearly equivalently, the number of neutrons travelling through a unit area in unit time. In either case, a greater neutron flux yields a greater probability of a neutron colliding with a nuclear fuel atom.

The four main reactivity coefficients in a fast neutron sodium-cooled nuclear reactor are, listed in chronological order: Doppler, axial, sodium, and radial. Reactivity coefficients parametrize the change in reactivity per degree of change in the temperature of the nuclear fuel resulting from various contributors. As previously described, the Doppler reactivity coefficient parametrizes the change in reactivity per degree of change in the temperature of the nuclear fuel resulting from Doppler broadening. The axial reactivity coefficient parametrizes the change in reactivity per degree of change in the temperature of the nuclear fuel cladding, which causes core axial fuel expansion. The sodium reactivity coefficient parametrizes the change in reactivity per degree of change in the temperature of the coolant, which causes expansion/voiding. (A coolant reactivity coefficient represents a more general version of the sodium reactivity coefficient.) The radial reactivity coefficient parametrizes the change in reactivity per degree of change in the temperature of the assembly duct, which causes core radial fuel expansion. A negative net/total reactivity coefficient provides a negative feedback on reactivity as the temperature of the nuclear fuel increases, thereby contributing to the stabilization of the nuclear fission reactor—as fuel temperature increases, reactivity decreases—contributing to a self-stabilizing nuclear fission reaction.

Figure 5:
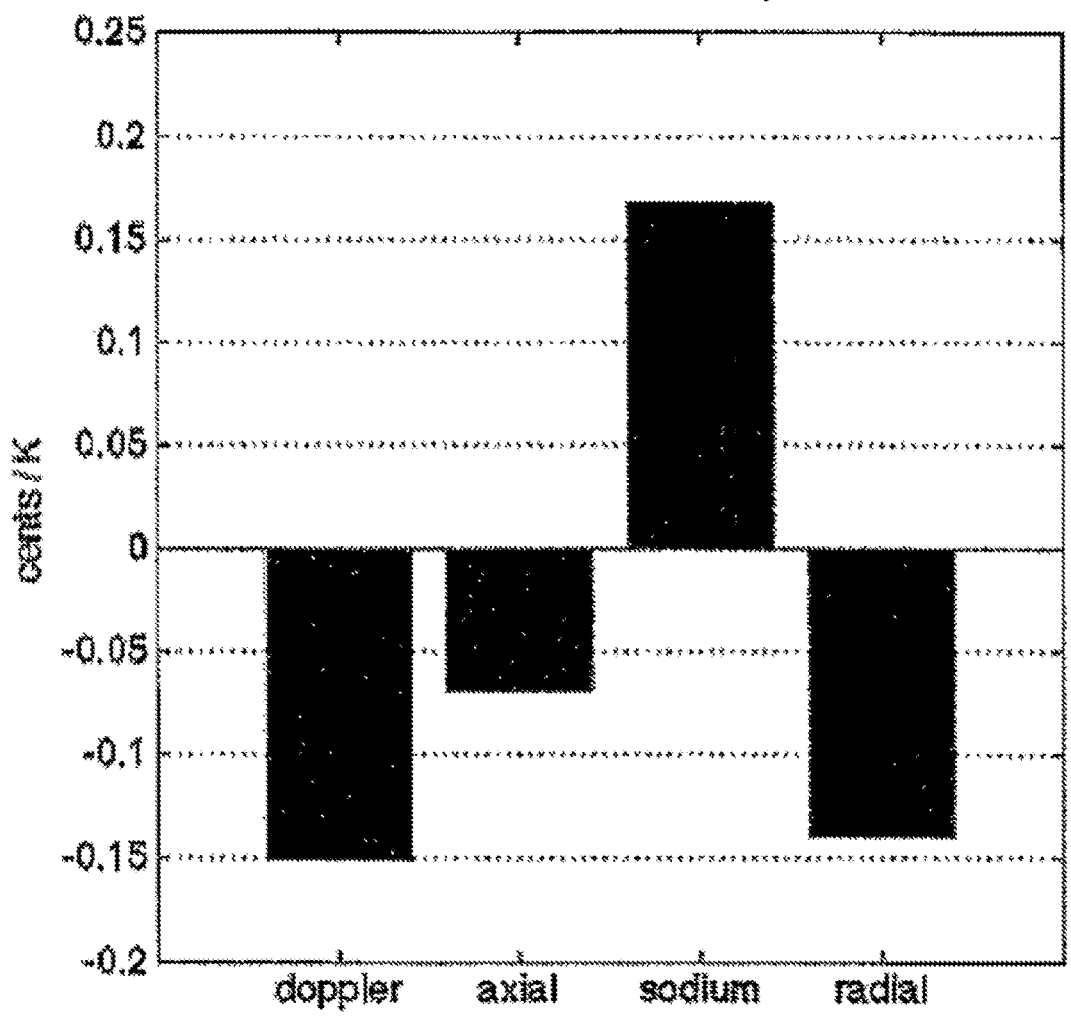
FIG. 5 illustrates example reactivity coefficients within a fast nuclear reactor having one or more Doppler reactivity augmentation devices inserted into device locations of a fast nuclear reactor core.

FIG. 5 illustrates example reactivity coefficients 500 within a fast nuclear reactor having one or more Doppler reactivity augmentation devices inserted into device locations of a fast nuclear reactor core. The reactivity coefficients are listed in chronological order from left to right. The Doppler reactivity coefficient is increased in the fast nuclear reactor core having one or more Doppler reactivity augmentation devices as compared to a fast nuclear reactor core having no Doppler reactivity augmentation devices. Furthermore, the sodium reactivity coefficient is decreased in the fast nuclear reactor core having one or more Doppler reactivity augmentation devices as compared to a fast nuclear reactor core having no Doppler reactivity augmentation devices. However, as previously described, each reactivity coefficient contributes to the reaction in a chronological manner. As such, the cumulative reactivity coefficient "insertion" at each point in time is considered in FIG. 6.

Table 1 shows example data showing changes in the four main reactivity coefficients in a fast neutron sodium-cooled nuclear reactor between a FAST REACTOR-S and a FAST REACTOR-V.

TABLE 1

Reactivity Coefficients in a FAST REACTOR-S and a FAST REACTOR-V

| Coefficient (cents/K) | Fast Reactor with Steel | Fast Reactor with Vanadium Alloy | Change (Δ) | Change (%) |
|---|---|---|---|---|
| Doppler | −0.0985 | −0.151 | −0.053 | 53% |
| Axial | −0.0939 | −0.0687 | 0.025 | −27% |
| Sodium | 0.216 | 0.167 | −0.049 | −23% |
| Radial | −0.174 | −0139 | 0.035 | −20% |
| Net | −0.150 | −0.191 | −0.041 | 27% |

Figure 6:
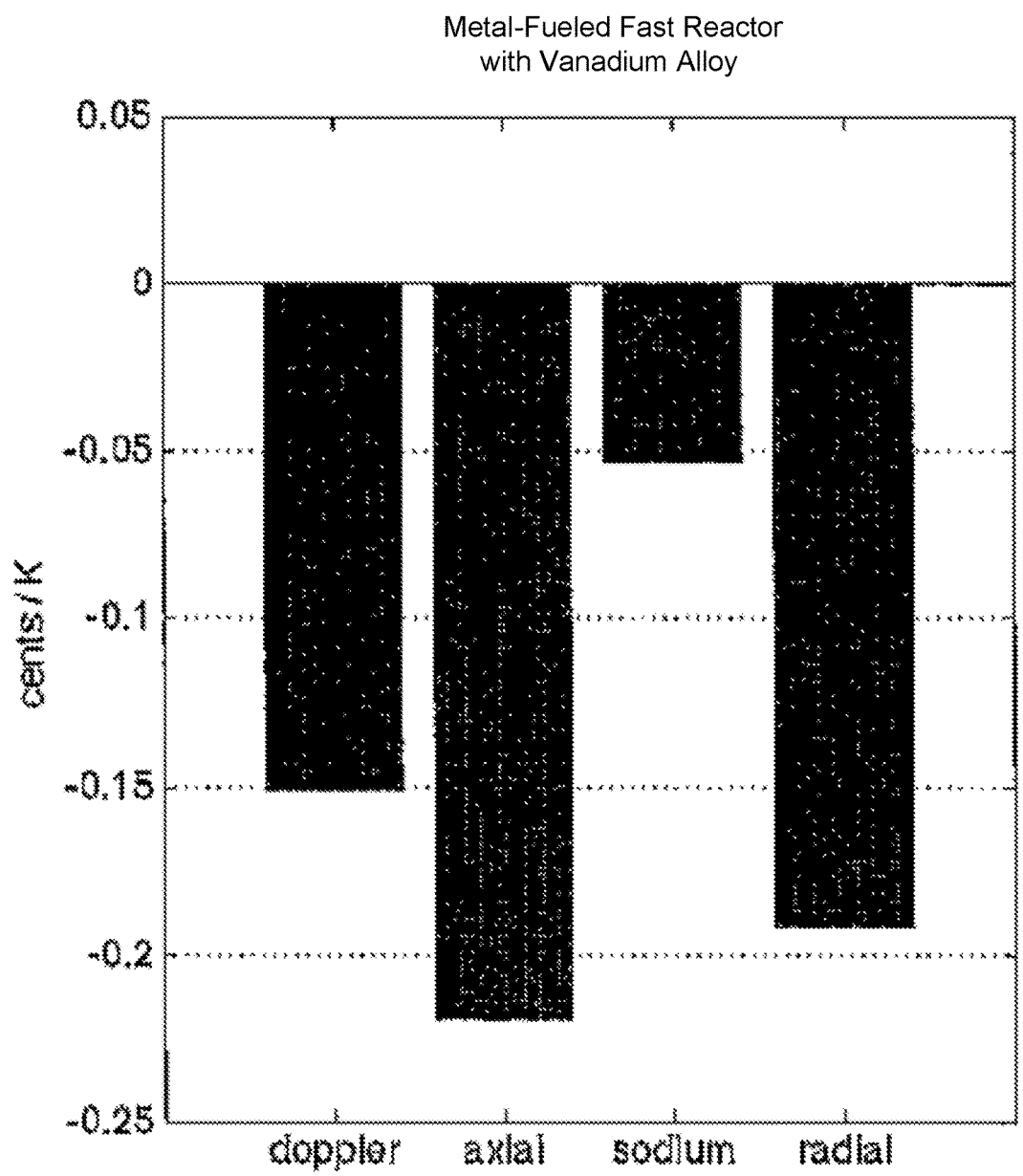
FIG. 6 illustrates an example cumulative reactivity coefficient insertion over time, based on an integration of the individual reactivity coefficients as a function of time.

FIG. 6 illustrates an example cumulative reactivity coefficient insertion 600 ("net reactivity insertion") over time, based on an integration of the individual reactivity coefficients as a function of time. Because the combination of the Doppler reactivity coefficient is increased and the sodium reactivity coefficient is decreased in the fast nuclear reactor core having one or more Doppler reactivity augmentation devices, the net reactivity insertion remains negative at each point in time, providing negative reactivity feedback as fuel temperature rises and contributing to enhanced stability of the fission reaction.

Figure 7:
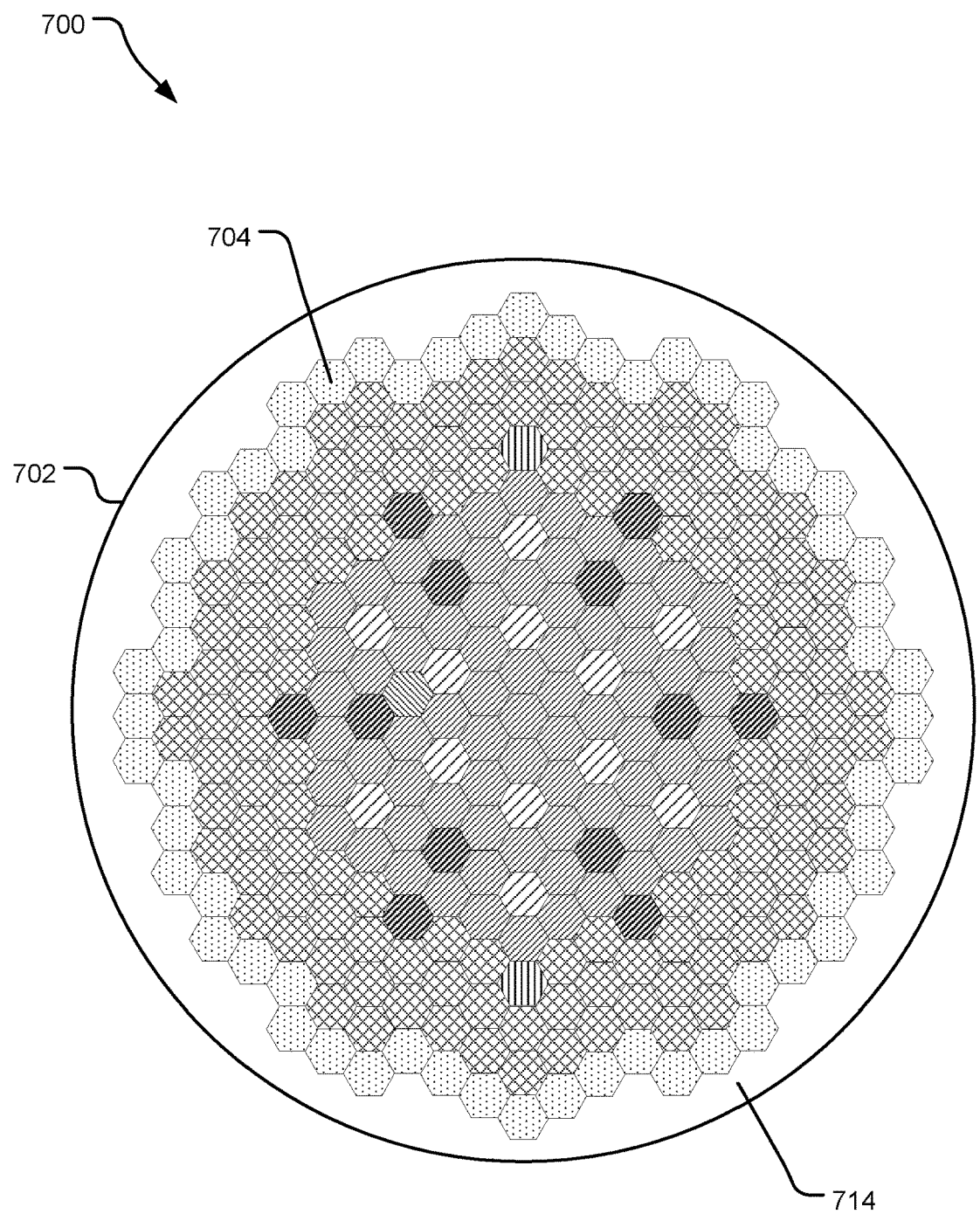
FIG. 7 illustrates a cross-sectional view of an example fast nuclear reactor core having an array of locations of nuclear reactor core devices, including Doppler reactivity augmentation assembly devices.

FIG. 7 illustrates a cross-sectional view 700 of an example fast nuclear reactor core 702 having an array of locations (such as device location 704) of nuclear reactor core devices, including Doppler reactivity augmentation devices. It should be understood that a fast nuclear reactor core typically has more device locations and devices than shown in the example core of FIG. 7, but a reduced number of device locations and devices is shown to facilitate description and illustration. Each device is inserted into a structurally-defined device location within the array. Reflector devices, such as a replaceable radiation reflector device at the device location 704, and permanent radiation reflector material 714 are positioned at the boundary of the central reactor core region to reflect neutrons back into the central reactor core region.

Figure 8A:
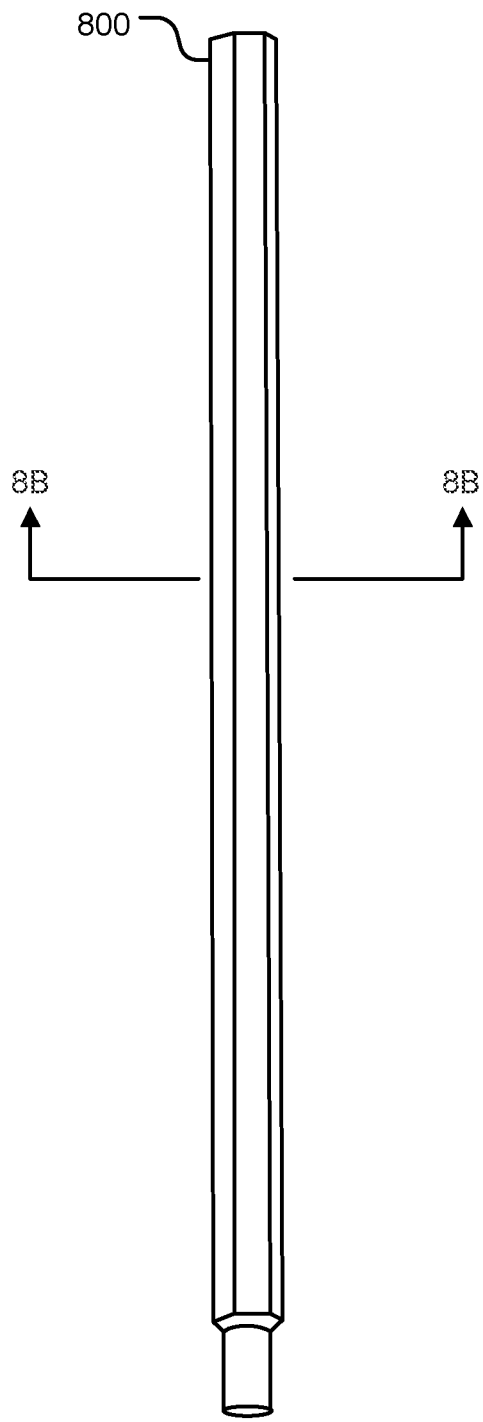
FIGS. 8A and 8B illustrate a side plan view and cross-sectional view of an example Doppler reactivity augmentation device in the form of a reactivity control duct.
Figure 8B:
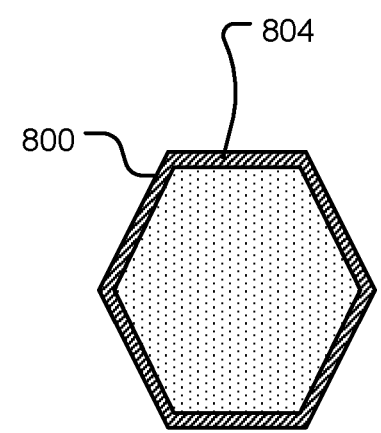

FIGS. 8A and 8B illustrate a side plan view and cross-sectional view of an example Doppler reactivity augmentation device 800 in the form of a reactivity control duct. In one implementation, the outer structural wall 804 of the reactivity control duct form of the Doppler reactivity augmentation device 800 is formed from a Doppler reactivity augmentation material having a neutron scattering cross-section resonance peak near 10 keV, and therefore, contributing to enhanced elastic neutron scattering in the Doppler broadening energy range of the nuclear fuel (e.g., of the fertile nuclear fuel uranium-238). Example Doppler reactivity augmentation materials include without limitation vanadium, vanadium alloys, titanium, and titanium alloys. The outer structural wall 804 forms a channel allowing for the flow of a liquid coolant, such as liquid sodium. The Doppler reactivity augmentation device 800 may be moved in and out of (e.g., inserted into or removed from) device locations of the nuclear reactor core, although the Doppler reactivity augmentation device 800 may also be fixed in the nuclear reactor core.

Figure 9A:
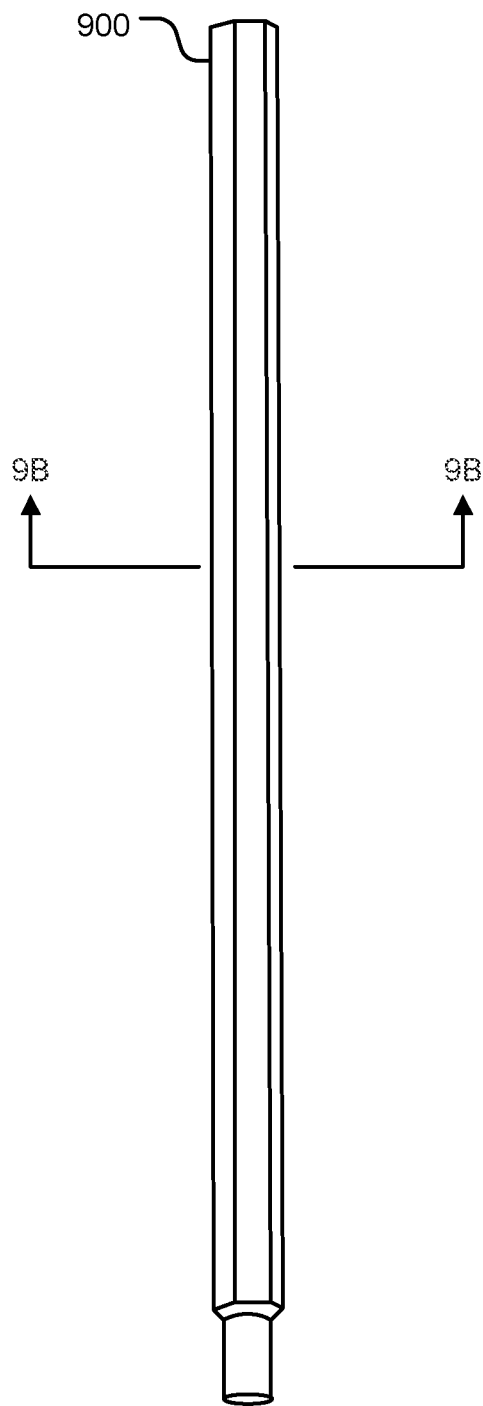
FIGS. 9A and 9B illustrate a side plan view and cross-sectional view of an example Doppler reactivity augmentation device in the form of a Doppler augmentation assembly device.
Figure 9B:
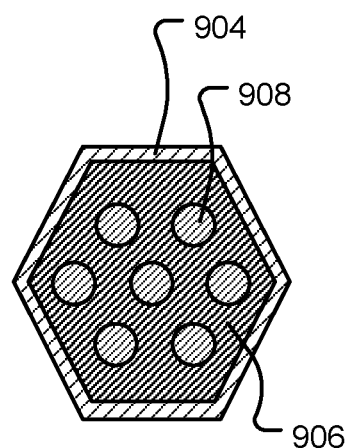

FIGS. 9A and 9B illustrate a side plan view and cross-sectional view of an example Doppler reactivity augmentation device 900 in the form of a Doppler augmentation assembly device. In one implementation, the outer structural wall 904 of the reactivity control duct form of the Doppler reactivity augmentation device 900 is formed from stainless steel (e.g., HT9) and encompasses a core 906 of Doppler reactivity augmentation material having a neutron scattering cross-section resonance peak near 10 keV, and therefore, contributing to enhanced elastic neutron scattering in the Doppler broadening energy range of the nuclear fuel (e.g., of the fertile nuclear fuel uranium-238). Example Doppler reactivity augmentation materials include without limitation vanadium, vanadium alloys, titanium, and titanium alloys. In one implementation, the core 906 includes one or more channels (such as a channel 908) allowing for the flow of a liquid coolant, such as liquid sodium. The Doppler reactivity augmentation device 900 may be moved in and out of (e.g., inserted into or removed from) device locations of the nuclear reactor core, although the Doppler reactivity augmentation device 800 may also be fixed in the nuclear reactor core.

Figure 10:
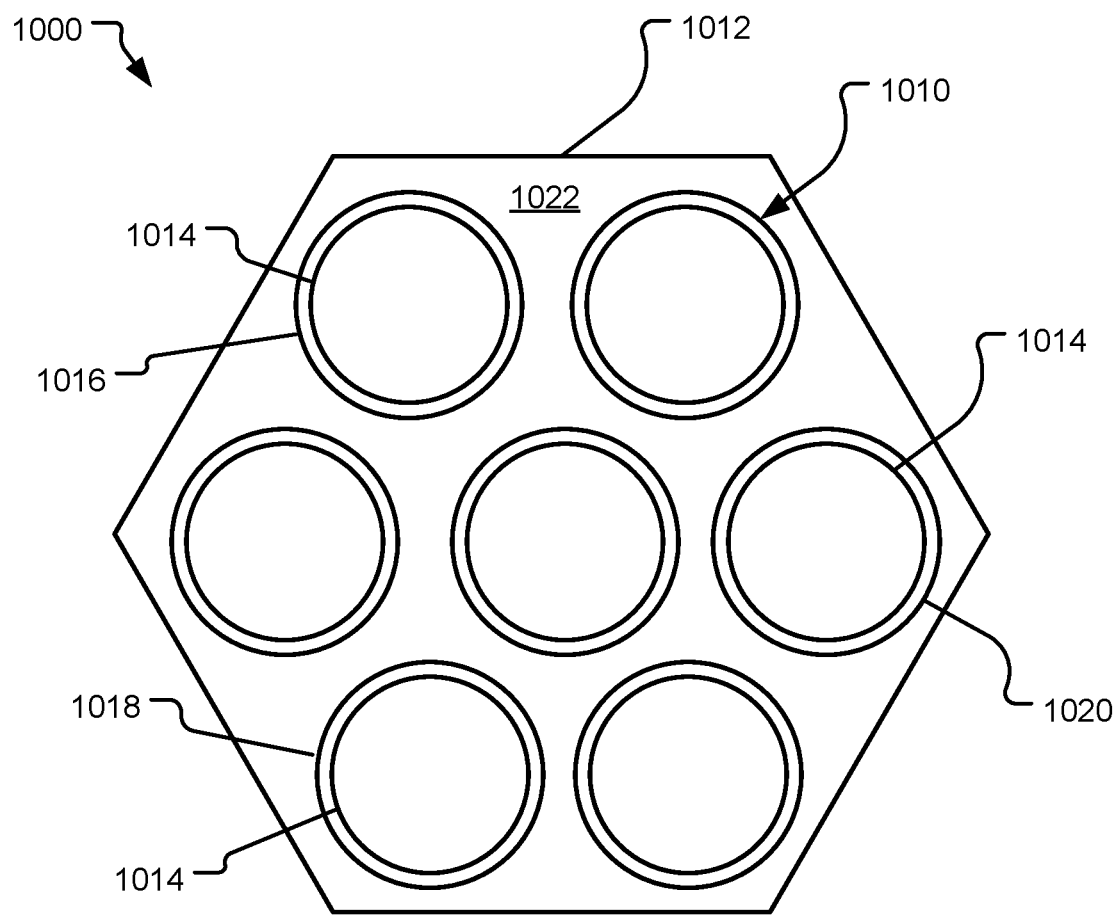
FIG. 10 illustrates a schematic perspective view of a plurality of fuel pins in the form of a Doppler augmentation assembly device.

As described above in respect to FIG. 1, a Doppler reactivity augmentation device may be a nuclear fuel assembly device. FIG. 10 shows a nuclear fuel assembly device 1000 as a Doppler reactivity augmentation device. The nuclear fuel assembly device 1000, which can be in the nuclear reactor core (e.g., core 102 of FIG. 1) can include a solid hexagonal tube 1012 surrounding a plurality of fuel elements, such as fuel pins 1010, which are organized into the nuclear fuel assembly device 1000. Non-hexagonal tubes may also be used on some implementations. The tubes 1012 in a nuclear fuel assembly device 1000 allow coolant to flow past the fuel pins 1010 through interstitial gaps between adjacent tube walls 1012. Fuel pins 1010 typically consist of multiple nuclear fuel rods 1014 (such as uranium, plutonium or thorium) surrounded by a liner 1016 and/or a cladding 1018 (and/or sometimes an additional barrier 1020), which prevents radiative material from entering the coolant stream. Individual pins 1010 of a nuclear fuel assembly device 1000 in the fast nuclear reactor core can contain fissile nuclear fuel or fertile nuclear fuel. There may be one or more grid spacers 1022 separating the nuclear fuel pins 1010. The Doppler scattering material may be in one or more of the liner 1016, the cladding 1018, the barrier 1020, or the grid spacer(s) 1022.

Figure 11:
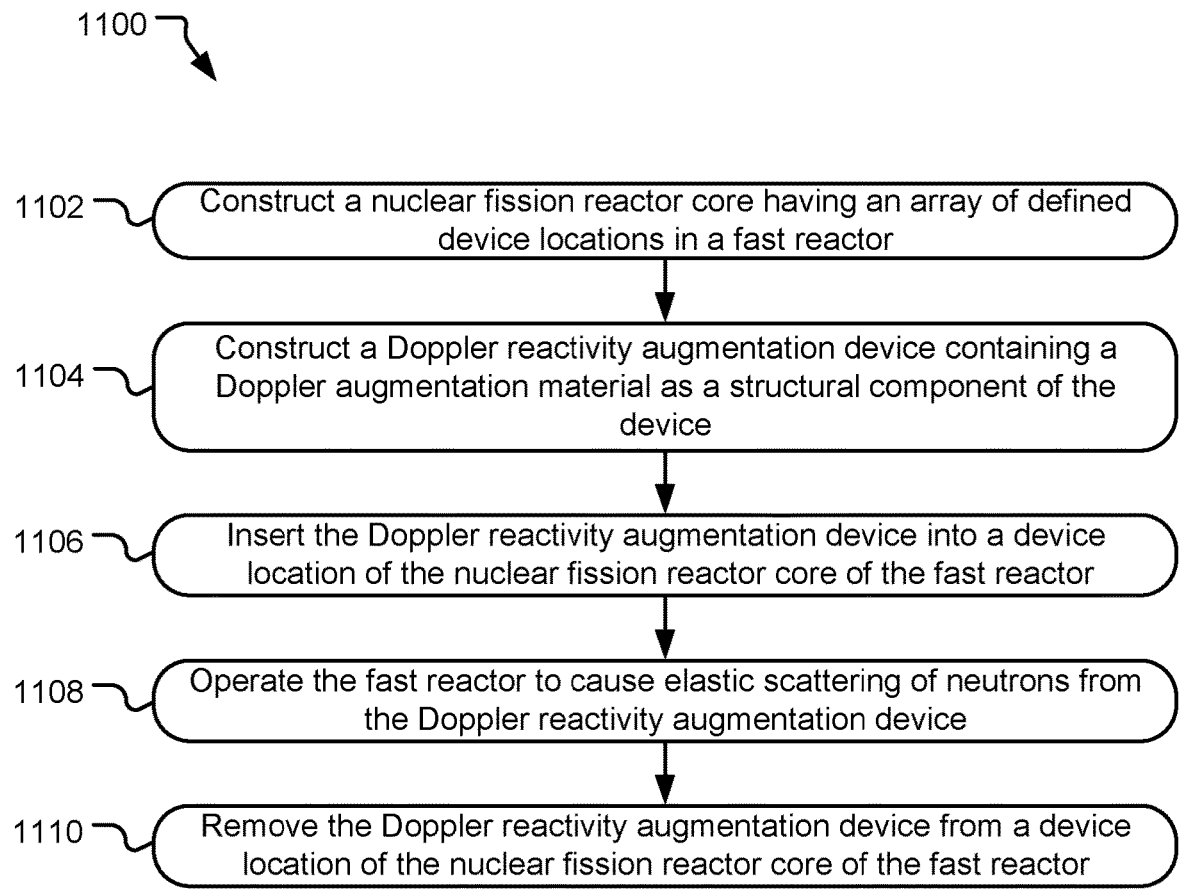
FIG. 11 illustrates example operations for augmenting Doppler reactivity within a nuclear reactor core.

FIG. 11 illustrates example operations 1100 for augmenting Doppler reactivity within a nuclear reactor core. A construction operation 1102 constructs a nuclear fission reactor core having an array of defined device locations, such as individual device locations formed from refractory materials. In one implementation, the nuclear fission reactor core resides in a liquid metal fueled, liquid sodium-cooled fast neutron breed-and-burn fission reactor system. Another construction operation 1104 constructs a Doppler reactivity augmentation device that contain a Doppler augmentation material as a structural component of the device, although Doppler reactivity augmentation devices may additionally or alternatively include a Doppler augmentation material as a non-structural material.

An insertion operation 1106 inserts the Doppler reactivity augmentation device into a device location of the nuclear fission reactor core. An operating operation 1108 operates the fast reactor to cause elastic scattering of neutrons from the Doppler reactivity augmentation device within the broadening range of fertile nuclear fuel of the nuclear fission core of the fast reactor. A removal operation 1110 removes the Doppler reactivity augmentation device from a device location of the nuclear fission reactor core (e.g., for maintenance). Accordingly, in some implementations, a Doppler reactivity augmentation device can be movable, while in other implementation a Doppler reactivity augmentation device may be fixed within the reactor core.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A fast nuclear fission reactor comprising:
    a fast neutron nuclear reactor core containing a central core array structure having multiple device locations;
    a nuclear fuel assembly inserted in a first device location of the fast neutron nuclear reactor core and containing nuclear fuel characterized by Doppler broadening constrained within a defined energy range, the nuclear fuel assembly being formed of a material having less than 10% vanadium or titanium by mass; and
    a Doppler reactivity augmentation device, shaped to be interchangeable with the nuclear fuel assembly, inserted in a second device location of the fast neutron nuclear reactor core and formed at least in part from a scattering material characterized by a neutron scattering cross-section having at least one resonance within the defined energy range of the nuclear fuel of the nuclear fuel assembly to provide down scattering of fast neutrons, the scattering material being formed from an alloy having at least 10% vanadium or titanium by mass.

2. The fast nuclear fission reactor of claim 1 wherein the scattering material includes vanadium or a vanadium-based alloy.

3. The fast nuclear fission reactor of claim 1 wherein the scattering material includes titanium or a titanium-based alloy.

4. The fast nuclear fission reactor of claim 1 wherein the defined energy range defines an energy range between 1 keV and 30 keV inclusively.

5. The fast nuclear fission reactor of claim 1 wherein the Doppler reactivity augmentation device includes a structural form of the scattering material.

6. The fast nuclear fission reactor of claim 1 wherein the Doppler reactivity augmentation device includes a control duct having an external structural wall formed at least in part from the scattering material.

7. The fast nuclear fission reactor of claim 6 wherein the control duct is configured to allow liquid coolant to flow through the control duct.

8. The fast nuclear fission reactor of claim 1 wherein the Doppler reactivity augmentation device includes an assembly having an external structural wall encompassing a core of the scattering material.

9. The fast nuclear fission reactor of claim 8 wherein the core of scattering material includes one or more channels configured to allow liquid coolant to flow through the Doppler reactivity augmentation device.

10. The fast nuclear fission reactor of claim 1 wherein the fast neutron nuclear reactor core is immersed in a pool of liquid sodium coolant.

11. The fast nuclear fission reactor of claim 1 wherein the fast nuclear fission reactor is configured to operation operate with an average neutron energy of greater than or equal to 0.1 MeV.

12. The fast nuclear fission reactor of claim 1 wherein a net reactivity insertion profile, based on a chronological order of a Doppler reactivity coefficient, an axial reactivity coefficient, a coolant reactivity coefficient, and a radial reactivity coefficient, remains negative during a fission reaction within the fast nuclear fission reactor.

13. The fast nuclear fission reactor of claim 1 wherein the Doppler reactivity augmentation device includes a reactivity control assembly device containing a structural form of the scattering material.

14. The fast nuclear fission reactor of claim 1 wherein the Doppler reactivity augmentation device includes cladding containing a structural form of the scattering material.

15. The fast nuclear fission reactor of claim 1 wherein the Doppler reactivity augmentation device includes wire wrap containing a structural form of the scattering material.

16. A fast nuclear fission reactor comprising: a fast neutron nuclear reactor core containing a central core array structure having multiple device locations; a nuclear fuel assembly inserted in a first device location of the fast neutron nuclear reactor core and formed of a material having less than 10% vanadium by mass; and a Doppler reactivity augmentation device, formed to be interchangeable with the nuclear fuel assembly, inserted in a second device location of the fast neutron nuclear reactor core and formed at least in part from a scattering material to provide down scattering of fast neutrons, the scattering material being formed at least in part from structural vanadium or a structural vanadium-based alloy having at least 10% vanadium by mass.

17. The fast nuclear fission reactor of claim 16 wherein the Doppler reactivity augmentation device includes a control duct having an external structural wall formed at least in part from the vanadium or a vanadium-based alloy.

18. The fast nuclear fission reactor of claim 17 wherein the control duct is configured to allow liquid coolant to flow through the control duct.

19. The fast nuclear fission reactor of claim 16 wherein the Doppler reactivity augmentation device includes an assembly having an external structural wall encompassing a core of the vanadium or a vanadium-based alloy.

20. The fast nuclear fission reactor of claim 19 wherein the core of the vanadium or the vanadium alloy includes one or more channels configured to allow liquid coolant to flow through the Doppler reactivity augmentation device.

21. The fast nuclear fission reactor of claim 16 wherein the fast neutron nuclear reactor core is immersed in a pool of liquid sodium coolant.

22. The fast nuclear fission reactor of claim 16 wherein the fast nuclear fission reactor is configured to operate with an average neutron energy of greater than or equal to 0.1 MeV.

23. The fast nuclear fission reactor of claim 16 wherein a net reactivity insertion profile, based on a chronological order of a Doppler reactivity coefficient, an axial reactivity coefficient, a coolant reactivity coefficient, and a radial reactivity coefficient, remains negative during a fission reaction within the fast nuclear fission reactor.

24. The fast nuclear fission reactor of claim 16 wherein the Doppler reactivity augmentation device includes a reactivity control assembly device containing a structural form of the scattering material.

25. The fast nuclear fission reactor of claim 16 wherein the Doppler reactivity augmentation device includes cladding containing a structural form of the scattering material.

26. The fast nuclear fission reactor of claim 16 wherein the Doppler reactivity augmentation device includes wire wrap containing a structural form of the scattering material.

27. A method of operating a nuclear fission reactor comprising:
constructing a fast neutron nuclear reactor core containing a central core array structure having multiple device locations;
inserting a nuclear fuel assembly in a first device location of the fast neutron nuclear reactor core and containing nuclear fuel characterized by Doppler broadening constrained within a defined energy range, the nuclear fuel assembly being formed of a material having less than 10% vanadium or titanium by mass; and
inserting a Doppler reactivity augmentation device in a second device location of the fast neutron nuclear reactor core, the Doppler reactivity augmentation device being shaped to be interchangeable with a nuclear fuel assembly and formed at least in part from a scattering material to provide down scattering of fast neutrons, the scattering material being formed from an alloy having at least 10% vanadium or titanium by mass.

28. The method of claim 27 wherein the vanadium or the vanadium alloy provides at least part of the structure of the Doppler reactivity augmentation device.

29. The method of claim 27 wherein the Doppler reactivity augmentation device includes a control duct having an external structural wall formed at least in part from the vanadium or the vanadium alloy.

30. The method of claim 29 further including flowing liquid coolant through the control duct.

31. The method of claim 27 wherein the Doppler reactivity augmentation device includes an assembly having an external structural wall encompassing a core of the vanadium or the vanadium alloy.

32. The method of claim 31 wherein the core of the vanadium or the vanadium alloy includes one or more channels configured to allow liquid coolant to flow through the Doppler reactivity augmentation device.

33. The method of claim 32 further comprising: flowing liquid coolant through the one or more channels of the Doppler reactivity augmentation device.

34. The method of claim 27 further comprising: immersing the fast neutron nuclear reactor core in a pool of liquid sodium coolant.

35. The method of claim 27 further comprising: operating the nuclear fission reactor with an average neutron energy of greater than or equal to 0.1 MeV.

36. The method of claim 27 wherein a net reactivity insertion profile, based on a chronological order of a Doppler reactivity coefficient, an axial reactivity coefficient, a coolant reactivity coefficient, and a radial reactivity coefficient, remains negative during a fission reaction within the fast nuclear fission reactor.

* * * * *